Figure 1:
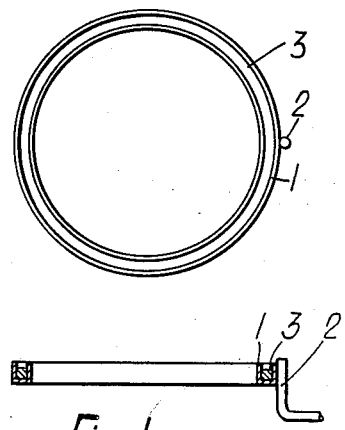

May 5, 1964  J. H. O. HARRIES  3,131,983
EVACUATION OF VACUUM AND GAS FILLED ENVELOPES
Filed May 6, 1960  2 Sheets-Sheet 1

Inventor
John H. O. Harries
By Kemon, Palmer & Stewart
Attorney

May 5, 1964          J. H. O. HARRIES          3,131,983
EVACUATION OF VACUUM AND GAS FILLED ENVELOPES
Filed May 6, 1960                    2 Sheets-Sheet 2
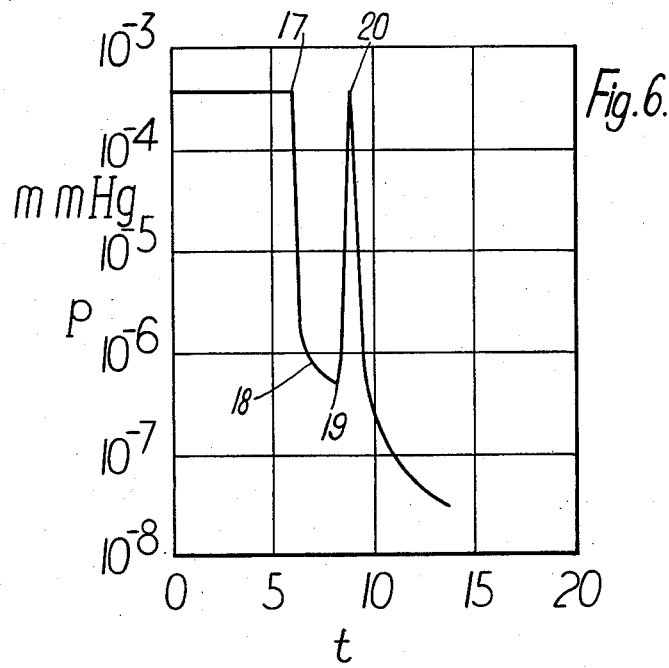
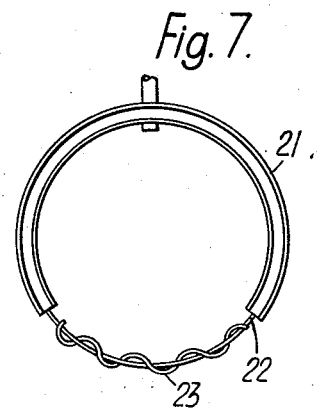
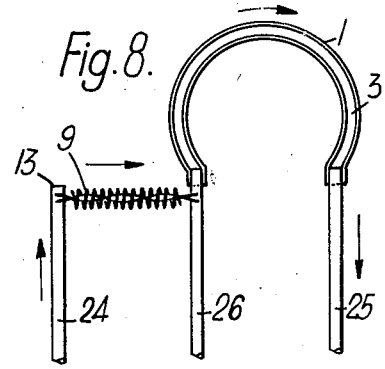
Inventor
John H. O. Harries
By Kenyon, Palmer & Stewart
Attorney

United States Patent Office 3,131,983
Patented May 5, 1964

3,131,983
EVACUATION OF VACUUM AND GAS
FILLED ENVELOPES
John H. O. Harries, Warwick, Bermuda
Filed May 6, 1960, Ser. No. 27,445
Claims priority, application Great Britain May 14, 1959
6 Claims. (Cl. 316—25)

This invention relates to the evacuation of vacuum and gas filled envelopes particularly, but not exclusively, for use as the envelopes of electric discharge tubes, of enclosed transistors and of enclosed mechanical and electrical devices.

A known method of evacuating an envelope to a low pressure consists of initially lowering the pressure to a moderate extent by means of a suitable pump, and then evaporating or flashing getters to reduce the pressure to a much lower value. I have found that certain materials (for example, titanium) when evaporated in a gas which is at a moderately low pressure so as to operate as getters, operate most effectively to reduce the pressure still further only if the pressure is initially low and only if relatively clean gases are present; the presence of water vapour, oil, and the more complicated and dirty gases (for example gases which are commonly driven out of electrodes in the vacuum envelope in initial stages of the exhaust, gases which sometimes emanate from a mechanical or other vacuum pump, organic gases produced when dirty marks are heated in a vacuum, and impurities present in the air initially in the tube) are found to inhibit the gettering action of these materials very severely. These gettering materials will be referred to in this specification as "inhibitable getter materials." On the other hand, I have also found that other gettering materials exist (for example, barium and the barium aluminum combinations commonly used in the commercial exhaust of vacuum tubes) which are inhibited to a far smaller extent by the dirty and complicated gases found in the earlier stages of exhaust, but which are not as effective in reducing the pressure to a low value as are the inhibitable materials when these materials are used at low pressures and with clean gas. These gettering materials will be referred to herein as "initial gettering materials."

According to my invention first and second getters of different materials are disposed in communication with the interior of the envelope to be exhausted and the pressure within the envelope is reduced to a point at which the getters can be used, after which the first getter is flashed, followed by the flashing of the second getter after an interval of time sufficient to allow a substantial reduction in the rate of fall of pressure following the flashing of the first getter, the first getter to be flashed being of a material which is substantially less inhibited than the material of the second getter by the presence of gases found in the early stages of exhaust and the second being of a material capable of further reducing the pressure after the flashing of the first getter. As a result, any dirty and complicated gases initially present are reduced in pressure to a moderate but important extent by the first getter, and then the second getter is presented with an environment such that it is very effective when it is flashed. Hence the ultimate pressure reached after flashing both getters in the above sequence will be much lower than the pressure reached by flashing in the reverse sequence, or by either getter were it used alone, and a low pressure is reached more speedily.

The getters may be arranged in the envelope itself, or within a part of the system used to evacuate the envelope and in communication with the interior of the envelope.

Figure 2:
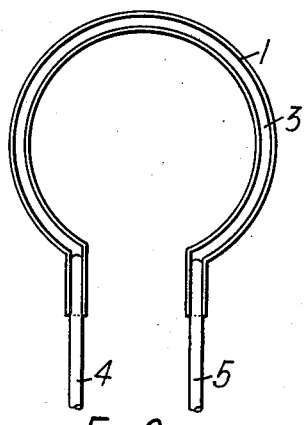
Figure 3:
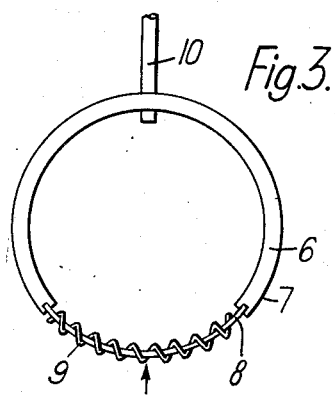
Figure 4:
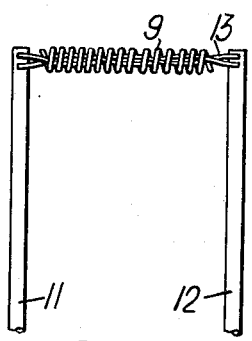
Figure 5:
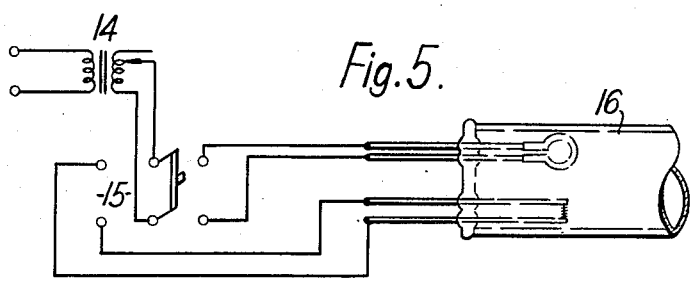

In order that the invention may be better understood, several embodiments thereof will now be described, by way of example, with reference to the accompanying drawings, in which:

FIGURES 1 and 2 show getters of the initial kind;
FIGURES 3 and 4 show getters of the inhibitable kind;
FIGURE 5 illustrates a gettering arrangement permitting sequential flashing of the getters;
FIGURE 6 is a graph showing pressure variation within the envelope during the flashing of the getters;
FIGURE 7 illustrates a gettering device supporting an initial getter and an inhibitable getter; and
FIGURE 8 illustrates a further gettering arrangement permitting sequential flashing of the getters.

FIGURE 1 shows a getter of the initial kind which consists of a channelled ring 1 made, for instance, of iron and welded to a support 2. In the channel 3 is a gettering material composed of 28.5% barium, 28.5% aluminium and 43% nickel which has a flashing temperature of approximately 975° C. An example of such a gettering material is that manufactured by King Laboratories Inc. of Syracuse 3, New York, under the trade name "Barex." The ring formation shown in FIGURE 1 is suitable for firing by means of an induction furnace.

FIGURE 2 shows a similar getter consisting of an incomplete ring through which current can be passed to heat and flash the getter. The connections to the getter are made by means of the lead wires 4, 5.

FIGURE 3 shows an inhibitable type of getter. The ring 6 consists of a relatively large 0.040" diameter portion 7 of tantalum, and a relatively small diameter tantalum portion 8 of about 0.020" diameter. Wound around the portion 8 are about twelve turns of titanium wire 9 approximately 0.005" diameter. A wire support 10 is welded to the ring 6. The current from an induction furnace can be arranged to circulate round the ring 6. The small diameter portion 8 of the ring will then get very much hotter than the rest of the ring 6 and the titanium wire will be evaporated to produce the gettering action. This operation should be performed with the titanium wire positioned at the lowest part of the ring so that the titanium, when it melts, forms a bead on the wire 8.

FIGURE 4 shows an inhibitable getter similar to FIGURE 3 but adapted to heating by means of an electric current passed through the leads 11, 12. In this case the turns of titanium wire 9 are wrapped round two twisted tantalum wires each 0.005" diameter.

The diameter of the rings in FIGURES 1, 2 and 3 may be about half an inch. The lengths of the tantalum heater 13 in FIGURE 4 may be about 0.375".

FIGURE 5 shows a method by which the getter of FIGURE 2 and that of FIGURE 4 may be successively flashed by means of alternating current controllably supplied from the tapped transformer 14, using a change-over switch 15. The getters are shown in a vacuum envelope 16.

FIGURE 6 shows a plot of the pressure $p$ in a vacuum tube against time $t$ when getters of the materials described above are flashed in the required sequence. At a time $t=0$, the pressure has been reduced by means of a mechanical pump, for example, or by adsorption by activated charcoal, to a pressure between $10^{-3}$ to $10^{-4}$ mm. Hg. At a time indicated at 17 in FIGURE 6, an initial getter of the kind shown in FIGURE 1 or FIGURE 2 is flashed and the pressure drops sharply to about $10^{-6}$ mm. Hg. The pressure then tends to level out during the short time interval indicated arbitrarily as lying between the points marked 18 and 19 in FIGURE 6. At the time corresponding to the point 19, at which point the rate of fall of pressure resulting from the flash of the initial getter is substantially reduced, an inhibitable getter such as that shown in FIGURE 3 or 4 is flashed. The pressure rises sharply but temporarily to the peak 20. It then falls rapidly and levels off, reaching a pressure which lies between $10^{-7}$ and $10^{-8}$ mm. Hg. It will be realised that the exact times and pressures shown will depend in a given instance on the volume of the envelope, the amount of gas evolved from electrodes etc., and the amount of gettering material evaporated and other obvious factors.

The time interval between the flashing of the two classes of getter should be such that the initial getter has time to cause a substantial reduction of the pressure and to remove the dirty gas, so that the inhibitable getter can operate successfully. In a typical case, this time interval is about eight minutes.

If a getter of the initial kind (for example, a barium-aluminium getter) is flashed alone, I have found that the pressure in practical vacuum tubes does not drop lower than about $10^{-5}$ to $10^{-6}$ mm. Hg. Likewise, if a getter of the inhibitable kind (for example, a titanium getter) is flashed alone in such tubes, the pressure does not as a rule fall even as low as this because of the dirty and complicated gases which are ordinarily present in a practical vacuum tube which has been exhausted to the usual preliminary extent and the electrodes and envelope of which have been de-gassed. If, however, the inhibitable getter is flashed after the initial getter has been flashed and has cleaned up the dirty and complicated gas, then the lower range of pressures can be reached. If the two getters are flashed in the reverse and incorrect order, namely, if the inhibitable getter is flashed first and the initial getter second, the lower pressures will not be reached.

FIGURE 7 shows a getter ring combining both classes of getter for flashing by means of an induction furnace. Part 18 of the ring contains the BaAlNi material already described with reference to FIGURE 1 and a tantalum wire 22 forming the rest of the ring supports the titanium getter wire 23. By suitably choosing the cross section of the parts 21 and 22, taking into account the fact that the BaAlNi getter material of the initial kind will flash at about 975° C., and that the titanium gettering wire 20 will not flash until a temperature of approximately 1700° C. is reached, the two getters may be arranged to flash in the appropriate sequence, as shown in FIGURE 7 and with an appropriate time interval between their flashing.

FIGURE 8 shows a method of supporting two kinds of getter by means of three supports 24, 25 and 26 so that they can be flashed successively by passing a current through the supports 24 and 25 in the direction of the arrows.

Control of the sequence of flashing may be obtained by shunting a suitable resistance across either the support wires 24 and 26 or the support wires 26 and 25.

In addition to the getter structures shown in the drawing other suitable structures may be used. For example, instead of positioning the barium aluminium gettering material in a channel as shown in FIGURES 1, 2, 7 and 8, it may be in the form of pellets which are fastened to a backing plate or wire which is heated. In the case of the titanium getters of FIGURES 3, 4 and 8, for example, the tantalum heater wires 8, 13 and 22 may be substituted by a channel-shaped titanium member with the tantalum fastened into the channel. As another alternative, the titanium and tantalum wires of, for example, the getter shown in FIGURE 4 may be interwoven in the manner of the strands of a rope instead of winding the titanium wire 9 around the tantalum wires 13 as shown in FIGURE 4.

By known means the timing of the flashing of the two classes of getter may be controlled automatically in relation to the pressure reached in the vacuum tube as read by a vacuum gauge.

The getters may be used in conjunction with a vacuum gauge or ion pump to assist their action.

I claim:
1. A method of exhausting a vacuum envelope, including the steps of disposing first and second flash getters comprising barium and titanium respectively in communication with the interior of the envelope to be exhausted, reducing the pressure within the envelope to a point at which the getters can be used, flashing the first getter, and flashing the second getter after an interval of time sufficient to allow a substantial reduction in the rate of fall of pressure following the flashing of the first getter, whereby the flashing of the barium-containing getter reduces the amounts of gases found in the early stages of exhaust which would inhibit the operation of the titanium-containing getter and the titanium-containing getter then further reduces the pressure in the envelope, beyond the limit obtainable with the barium getter.

2. A method as claimed in claim 1 in which said getter materials are raised to their respective flashing temperatures by passing electric current therethrough.

3. A method as claimed in claim 1 wherein said interval of time is about eight minutes.

4. A method of exhausting a vacuum envelope which comprises flashing a barium flash getter in communication with the interior of said envelope having therein a gas pressure low enough for the getter to be effective although higher than the desired ultimate pressure, waiting an interval of time after the flashing of said barium getter for said flashing to further reduce the pressure within the envelope and then flashing a titanium flash getter in communication with the interior of said envelope to reduce the pressure within the envelope still further whereby the ultimate pressure reached in the envelope after firing of both of said getters is lower than the ultimate pressure which would be obtained by the flashing of either getter alone.

5. A method of exhausting a vacuum envelope comprising the steps of disposing a barium flash getter and a titanium flash getter within the interior of an envelope to be exhausted, reducing the pressure within the envelope by means of a pumping device in communication with the envelope to a pressure between about $10^{-3}$ and $10^{-4}$ mm. Hg, thereafter flashing the barium getter and flashing the titanium getter after an interval of time sufficient to allow a substantial reduction in the rate of fall of pressure within the envelope following the flashing of the barium getter, and when the pressure within the envelope is between about $10^{-6}$ and $10^{-7}$ mm. Hg.

6. A method of exhausting a vacuum envelope including the steps of disposing within the interior of an envelope to be exhausted a barium flash getter and a titanium flash getter, reducing the pressure within the envelope to a point at which the getters can be flashed, flashing the barium getter and flashing the titanium getter after an interval of time sufficient to allow a substantial reduction in the rate of fall of pressure following the flashing of the first getter, whereby the barium getter reduces the amounts of gases found in the early stages of exhaust which would inhibit the operation of the titanium getter and the titanium getter then further reduces the pressure in the envelope beyond the limit obtainable with the barium getter.

References Cited in the file of this patent

UNITED STATES PATENTS

| | | |
|---|---|---|
| 1,894,948 | Espe | Jan. 24, 1933 |
| 2,474,335 | Skellett | June 28, 1949 |
| 2,830,215 | Shrader | Apr. 8, 1958 |
| 2,841,732 | Morrell et al. | July 1, 1958 |
| 2,897,036 | Gale et al. | July 28, 1959 |
| 2,899,257 | Lederer | Aug. 11, 1959 |
| 2,988,265 | Reich | June 13, 1961 |
| 2,988,657 | Klopfer et al. | June 13, 1961 |

FOREIGN PATENTS

| | | |
|---|---|---|
| 117,817 | Sweden | Dec. 17, 1946 |